United States Patent Office 2,822,358
Patented Feb. 4, 1958

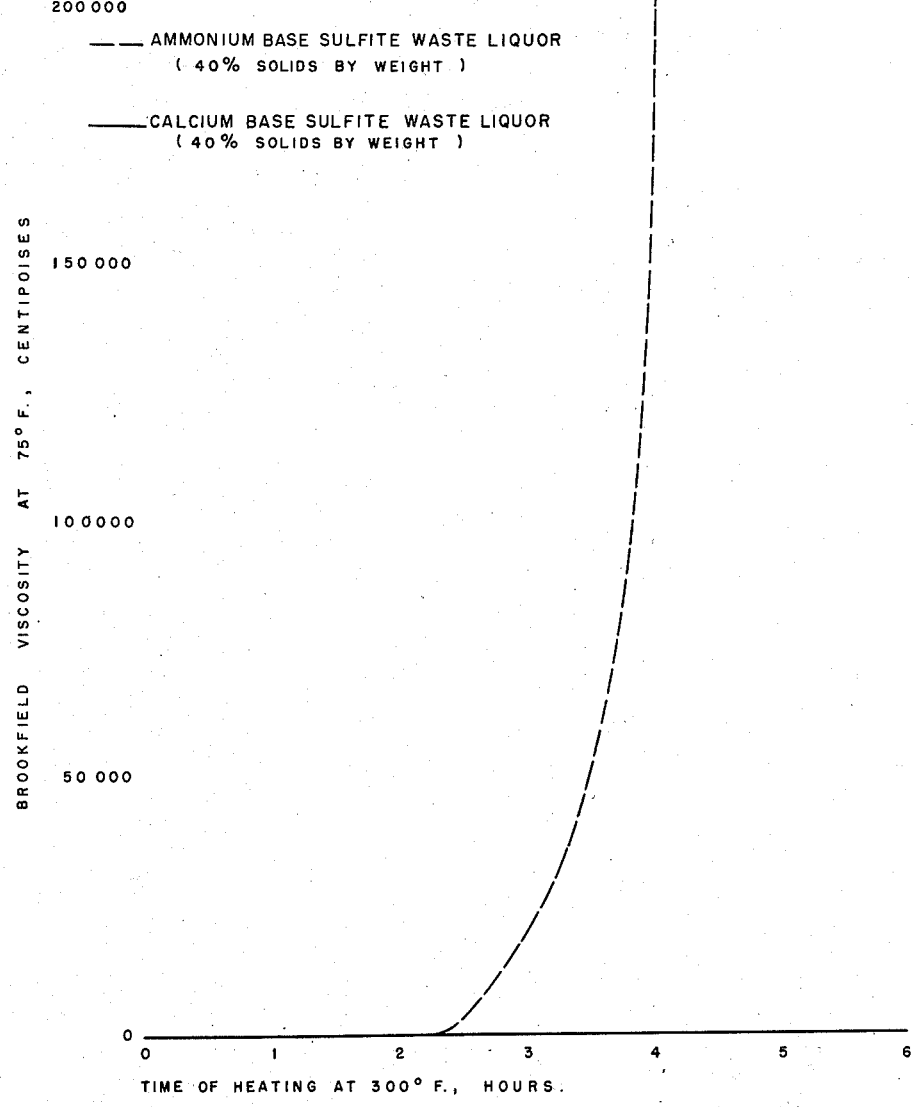

2,822,358

MODIFIED SULFITE WASTE LIQUOR AND PROCESS FOR ITS PREPARATION

William M. Hearon, Homer B. Lackey, and John B. Martin, Camas, Wash., assignors to Crown Zellerbach Corporation, San Francisco, Calif., a corporation of Nevada Application March 22, 1955, Serial No. 495,916

13 Claims. (Cl. 260—124)

This invention relates to a modified sulfite waste liquor product, and to a process for its preparation.

In the sulfite process for pulping wood and other lignocellulose, the lignocellulose in the form of small pieces is cooked under pressure with an aqueous liquor containing a sulfite compound and, frequently, sulfurous acid. Calcium bisulfite, sodium bisulfite, magnesium bisulfite and ammonium bisulfite are used as sulfite compounds in this process, which accordingly is termed the calcium-base, magnesium-base, sodium-base, or ammonium-base process depending upon which of these four pulping agents is employed.

During cooking of the lignocellulose the pulping agent reacts preferentially with the lignin, liberating the cellulose. The latter then is separated in the form of a pulp from the liquor, which is known as sulfite waste liquor and which comprises an aqueous solution of lignin sulfonic acids, wood sugars, and inorganic compounds. A typical sample of ammonium-base sulfite waste liquor derived from the pulping of western hemlock has an analysis falling within the following general range:

Percent by weight (solids basis)
Ammonium lignin sulfonates _____ 60–68
Reducing sugars (as glucose) _____ 14–20
Miscellaneous organic compounds _____ 10–25
Inorganic compounds _____ 0.5–2

The disposal of sulfite waste liquor long has been a classic pulp mill problem and serious efforts have been made to find volume commercial uses for it. Such efforts have been handicapped, however, by the fact that sulfite waste liquor in unmodified form has a viscosity so low that it is unsuitable for use in many applications. Also, attempts to modify it for viscosity improvement have resulted in the production of a product which is completely water insoluble and which accordingly is unsuited for use in other applications. Hence there is need for a process of converting sulfite waste liquor to water soluble products of increased viscosity applicable in the many applications where such a product is potentially useful.

The present invention relates to this general problem and has for its general object the provision of a process whereby sulfite waste liquor may be converted easily, inexpensively, and on a large scale into useful products having a wide variety of commercial applications.

The present invention is predicated upon the discovery that although the lignin sulfonates, wood sugars, and other constituents of sulfite waste liquor normally are substantially unreactive to each other in the absence of a nitrogen compound, a sulfite waste liquor containing a nitrogen compound of the classes stipulated herein becomes highly reactive upon heating under carefully controlled conditions. The ensuing reactions result in the polymerization and condensation of the waste liquor so that it is altered materially in the following respects:

(1) Its viscosity is increased;

(2) The hydrophilic characteristics of its constituents are decreased;
(3) Its pH is decreased;
(4) Its content of reducing sugars is decreased;
(5) Its nitrogen content which cannot be liberated by alkali is increased;
(6) Its percentage content of nitrogen, carbon, sulfur, and lignin sulfonic acids is increased;
(7) Its color is darkened.

The striking character of one of these changes, i. e. the change in viscosity, is illustrated in the single figure of the drawing. In this figure the viscosity of the sulfite waste liquor is plotted against the time of heating, in one case using a calcium-base sulfite waste liquor containing no nitrogen compound and in the other case using an ammonium-base sulfite waste liquor having a substantial content of nitrogen compounds comprising ammonium lignin sulfonates. It will be observed that heating the former liquor does not produce a material change in viscosity. However, heating the latter liquor produces a very marked increase in viscosity the increase being sufficient to turn the liquor, first to a gel, and ultimately to a water insoluble product, if the reaction has gone to completion.

According to this invention the reactions producing the foregoing changes must not be carried to completion, i. e. to complete water insolubilization of the waste liquor constituents, but they should be arrested at a selected intermediate point. As a result there may be obtained a series of modified sulfite waste liquor products having a range of properties and a corresponding wide range of uses, e. g. as adhesives, as surface active agents and the like.

Considering the foregoing in greater detail:

As has been indicated above, the sulfite waste liquor which is employed as a starting material for the presently described procedure may be derived from any of the conventional calcium-base, magnesium-base, sodium-base, or ammonium-base sulfite pulping operations. It may be used in the concentration in which it is obtained from the digester, i. e. at a solids content of about 10% by weight, or it may be concentrated to any desired degree, preferably to at least 30% solids by weight. If desired, the dry solid constituents of the waste liquor resulting from the evaporation of substantially all of the water from the liquor may be employed.

In executing the process, the sulfite waste liquor containing lignin sulfonic acids and wood sugars is heated together with a nitrogen compound of the class consisting of ammonia, ammonium hydroxide, the ammonium salts, the amines, urea, and guanidine. If the liquor is derived from the calcium-base, or the magnesium-base or the sodium-base pulping procedures, a sufficient amount of one or more of the above nitrogen compounds to furnish at least 0.1%, preferably from 1% to 10% by weight nitrogen, dry solids basis, may be added to the liquor and mixed with it. However, if the waste liquor is derived from the ammonium-base pulping procedure, its normal ammonium lignin sulfonate content suffices, since the nitrogen content of the latter normally ranges from 2 to 10% by weight, dry solids basis.

As has been indicated above, either ammonia or ammonium hydroxide are suitable for use in the herein described process for the modification of sulfite waste liquor, it being understood that the ammonia will be converted to amonium hydroxide upon its introduction into any mixture which is not acid in character and which has a water content.

The ammonium salts of the various inorganic and organic acids also are suitable for use in the present process. Examples of suitable ammonium salts thus are ammonium chloride, ammonium sulfate, ammonium phosphate, ammonium sulfide, ammonium sulfite, ammonium bisulfite, ammonium bisulfate, ammonium acid phosphate, ammonium nitrate, ammonium acetate, ammonium chloroacetate, ammonium propionate, ammonium butyrate, and the like. These may be used singly or in admixture with each other. Also, they may be added per se, or formed in situ by the addition to the liquor of ammonium hydroxide or gaseous ammonia, which may react with the constituents of the liquor to form the desired ammonium salts.

The primary and secondary aromatic amines also may be employed in the presently described procedure. Examples of suitable primary amines are methyl amine, ethyl amine, propyl amine, butyl amine, aniline and the like. Of these aniline is a preferred example. Methylaniline is an example of a suitable secondary aromatic amine.

Still further suitable for use in the presently described procedure are urea and guanidine which also have the sought-after effect of causing the modification of the sulfite waste liquor. These various nitrogen compounds may be used singly or in admixture with each other, or with other members of the indicated nitrogen compound classes.

To obtain a suitably modified product, it is required that the pH of the mixture comprising sulfite waste liquor and nitrogen compound fall within the broad range of from pH 1.5–10, preferably pH 2–7.5. At pH values of less than 1.5 the highly acid character of the medium induces undesirable side reactions. At pH values of more than pH 10, the desired modifying reactions involving the waste liquor and the nitrogen compound do not occur. However, when the initial pH of the mixture is within the indicated range, polymerization and condensation reactions occur during the heating operation between the constituents of the mixture to produce the desired modified waste liquor product.

In most instances the waste liquor will have a pH value falling within the indicated range. In this case, no further pH adjustment is required. However, if the waste liquor should have a pH of below 1.5 or above 10, then the pH must be adjusted by the addition of suitable acidic or basic materials. Such materials include the inorganic bases such as the basic acting compounds of the alkali metals, or the inorganic acids such as sulfuric acid, sulfurous acid, sulfur dioxide, hydrochloric acid, phosphoric acid, etc. These are added in amount sufficient to adjust the pH to within the desired or optimum range.

A preferred starting material for carrying out the processes of this invention comprises, as has been indicated above, the waste liquor resulting from the ammonium-base sulfite pulping of lignocellulose. This waste liquor contains ammonium ligninsulfonate in the amount required for effective reaction with the other constituents of the mixture. In addition, the pH of the liquor, normally varying between 2.5 and 7, is well within the required range. Thus this material may be used per se without addition of other nitrogen compounds, pH adjusting agents, or other additives of any sort.

After insuring that the mixture of nitrogen compound and sulfite waste liquor has a pH within the stipulated range of from 1.5–10, the mixture is heated to accomplish the chemical modification of its constituents. This step may be practiced upon the mixture in liquid form or, if desired, upon its solids content alone.

In the former procedure, the liquor should have a solids concentration of at least 5% by weight and preferably at least 30% by weight, to insure a reasonably rapid conversion rate. The liquor then is placed in a suitable container and heated at atmospheric pressure, preferably using an attached refluxing condenser or at autogenous elevated pressure.

The temperature of heating is variable, but in general should fall within the broad range of from 180–475° F. At temperatures below 180° F., the rate of conversion is too slow to be practicable. At temperatures of above 475° F., carbonization of the constituents of the mixture occurs. The preferred temperature range is between 210° F. and 400° F.

In the event that the mixture is to be heated in the solid state the following procedure may be practiced. First the sulfite waste liquor may be mixed with the nitrogen compound, if the latter already is not present in the liquor. It then may be dehydrated in any suitable manner, as by spray drying. The dry mixture next may be placed in an oven and heated to a temperature of from 180–475° F., preferably from 210–400° F., and preferably with agitation to insure uniform heating and prevent caking.

If desired, the dehydrating operation leading to the formation of a solid product and the heating operation for its modification advantageously may be combined. In this embodiment of the invention the sulfite waste liquor containing the nitrogen compound at the stipulated pH may be fed to spray drying apparatus of conventional type. It is heated therein at a temperature of from 180–475° F., preferably from 210–400° F., at a feed rate which is slower than that required for its dehydration. As a result, the dehydrated particles are subjected to the elevated temperature for a sufficient period to effectuate the desired conversion.

Accordingly, by varying the feed rate, a convenient and accurate means is available for controlling the duration of the heat treatment. Also, when using this technique, problems of sticking together and caking of the heated particles are not encountered.

The duration of the heat treatment necessary to produce the modified sulfite waste liquor products in accordance with this invention is variable depending upon the other operating conditions. Longer heating periods are required as the dilution of the mixture is increased, as the heating temperature is decreased, and as the pH is raised. In general, however, the heating is continued until the viscosity of the mixture has increased to a level at which an aqueous solution of the mixture having a 50% solids content by weight has a Brookfield viscosity at 75° F. of at least 350 centipoises, preferably between 1500 and 100,000 centipoises.

It is to be noted that this increase in viscosity occurs irrespective of whether the mixture is heated as an aqueous liquor or in the solid form. When the liquor is heated, it gradually thickens and forms a gel. When the solid is heated, its increased viscosity properties may readily be noted by dissolving the heated product in water, whereupon the resulting solution has a markedly increased viscosity over a solution of the same concentration using material which has not been heat-treated.

The heating operation may be stopped at any desired intermediate stage, or it may be carried to the point where further heating effectuates but little additional change in viscosity and the reaction mixture has changed to a gel, but not to a water insoluble product. As has been indicated above, a variable heating period may be required. In general a short heating period of five seconds in a flash drying operation at elevated temperatures will effectuate a measurable change in the viscosity of the mixture. A heating period of long duration, for example one of 48 hours, may be used, on the other hand, where it is necessary to heat the mixture at relatively low temperatures, or where it is desired to obtain a reaction product of high viscosity. Intermediate times of heating then may be employed as is required to reach the various intermediate stages of the conversion.

The chemical reactions occurring when a sulfite waste liquor is heated with a nitrogen compound of the classes described herein are complicated and the chemical products formed cannot be characterized precisely. However, during heating the various constituents of the mixture appear to polymerize. Condensation reactions wherein water is eliminated also occur. These various reactions accordingly build up molecular structures of substantial magnitude, which account for the increase in viscosity of the mixture.

After the heating operation is completed, the mixture may be cooled and applied to its various uses as an adhesive, a dispersant, a surface active agent, etc. In these and other applications it may be used per se, or in admixture with other materials as desirable or necessary.

The process of the invention and the product thereof are illustrated in the following examples, wherein all viscosity values are given in centipoises (Brookfield at 75° F.).

*Example 1*

This example illustrates the presently described process effectuated at normal atmospheric pressure.

The starting material for this experiment was the waste liquor resulting from the pulping of western hemlock wood by the ammonium-base sulfite process. The waste liquor was concentrated to a solids content of 50% by weight. It contained 3.7% by weight nitrogen, solids basis, and had a pH of 4.1. Its viscosity was 200 centipoises and its color was reddish brown.

The waste liquor was refluxed continuously at its normal boiling point of 216° F. in a steam-jacketed vessel having an attached reflux condenser. This enabled boiling the liquor continuously without loss of water. After 32 hours' refluxing, a sample of the liquor was examined. It was found to be a viscous liquid, the viscosity of which had increased to 378 centipoises; the pH of which had decreased to 3.3, and the color of which had become nearly black.

*Example 2*

This example illustrates the application of the present invention at elevated pressures.

A quantity of ammonium-base sulfite waste liquor similar to that used as the starting material in Example 1 but having a solids content of 40% by weight was heated under autogenous pressure at 320° F. for 3.5 hours, all water being retained in the reaction vessel. After cooling, the resulting liquid became a viscous water soluble gel.

*Example 3*

This example illustrates the application of the process of this invention to the production of a water soluble product of high viscosity.

A quantity of ammonium-base sulfite waste liquor similar to that used in Example 1 was used as a starting material. It had an initial solids content of 48.8% by weight, a pH of 4.12, a lignin sulfonic acid content of 64.77% and a reducing sugar content of 14.6%. This liquor was heated, at autogenous pressure for four hours at 300° F.

At the end of this time, the cooled liquor was a firm, black gel having a viscosity of more than 2,000,000 centipoises. It was completely soluble in hot water, but soluble with difficulty in cold water. Its pH was 2.38, its lignin sulfonic acid content 73.0% and its reducing sugar content less than 0.1%.

*Example 4*

This example illustrates the change in viscosity with reaction time in executing the process of the present invention.

A solution of ammonium-base sulfite waste liquor having a 40% solids content by weight and a pH of 3.7 was divided into four separate portions. Each portion was sealed in a stainless steel bomb and heated to a temperature of 300° F. After predetermined reaction times, each sample was opened and its pH and Brookfield viscosity (75° F.) determined. The results were as follows:

| Time of heating at 300° F. | pH | Viscosity, centipoises |
| --- | --- | --- |
| 0 hours (control) | 3.70 | 38 |
| 0.5 hour | 2.60 | 56 |
| 1.0 hour | 2.56 | 104 |
| 2.5 hours | 1.93 | 1,425 |
| 4.0 hours | 1.81 | 230,000 |

As a control the foregoing procedure was employed using a sample of calcium-base sulfite liquor having a solids content of 48%, a pH of 6.6 and an original Brookfield viscosity (75° F.) of 88 centipoises and in the absence of an added nitrogen compound. After a period of 4.0 hours heating at 300° F., the Brookfield viscosity (75° F.) of this liquor increased to only 92 centipoises.

The foregoing viscosity data are plotted in the graphs of the drawing. It will be apparent from a consideration of them that when sulfite waste liquor is heated in the presence of an ammonium salt, e. g. ammonium lignin sulfonate, a very marked reaction ensues, as is evidenced by the sharp increase in viscosity. However, in the absence of the nitrogen compound, little if any reaction occurs, as evidenced by the negligible viscosity increase after 4 hours of heating at 300° F.

*Example 5*

This example illustrates the change in viscosity of a sulfite waste liquor subjected to a spray-drying heat-treatment according to this invention.

As a control, ammonium-base sulfite waste liquor, concentrated to a solids content of 50% by weight, was fed to a conventional spray-drier having a temperature therein of 300° F. at a rate of 2500 lbs./hour which was sufficient only to effect its dehydration. Four additional quantities of the same liquor were also spray-dried at a higher temperature, i. e. 400° F. and lower feed rates than used for the control, and accordingly produced a heat modified product. Samples of the substantially dry, free-flowing powder obtained in this manner were dissolved in water to produce solutions having 50% solids content by weight, and Brookfield viscosities at 75° F. were determined thereon. The results were as follows:

| Feed Rate, lbs./hour | Temp., °F. | Viscosity, centipoises | Percent N[1] |
| --- | --- | --- | --- |
| 2,500 (control) | 300 | 200 | 0.96 |
| 2,382 | 400 | 402 | 1.35 |
| 1,523 | 400 | 991 | 1.34 |
| 1,115 | 400 | 1,685 | 1.49 |
| 865 | 400 | 2,150 | 1.52 |

[1] Which cannot be liberated by alkali.

The above results demonstrate that a series of sulfite waste liquor products of markedly increased viscosity were produced in accordance with this invention by subjecting a 50% waste liquor concentrate containing a nitrogen compound to the action of heat under carefully controlled conditions of temperature and time, as compared to the same concentrate spray-dried under conditions sufficient to merely effect its substantial dehydration.

*Example 6*

This example illustrates the process of this invention using ammonium hydroxide as the nitrogen compound. To 400 grams of calcium-base sulfite waste liquor solution having 50% solids by weight and a pH of 6.4 was added 15 grams of 57.6% ammonium hydroxide, or enough to furnish 1.7% nitrogen, based on the dry solids content of the waste liquor. The pH of the resulting mixture was 9.4. The mixture was heated at 300° F.

for 4 hours, and cooled. Its Brookfield viscosity (75° F.) had increased by about 130% over its initial viscosity.

*Example 7*

This example illustrates the process of this invention using an ammonium salt.

416 grams of calcium-base sulfite waste liquor solution having 48% solids content by weight, a pH of 4.3, and Brookfield viscosity (75° F.) of 88 centipoises was mixed with 10 grams of ammonium sulfate. This was sufficient to supply 1.1% nitrogen, based on the dry solids content of the waste liquor. The resulting solution was heated at 300° F. for 4 hours, then cooled and examined. It had a pH of 4.2, and a Brookfield viscosity (75° F.) of 590 centipoises.

*Example 8*

This example illustrates the process of the present invention using a primary amine as the nitrogen compound. 380 grams of calcium-base sulfite waste liquor solution having 50% solids content by weight, a pH of 6.6, and Brookfield viscosity (75° F.) of 78 centipoises was mixed with 38 grams aniline, which was a sufficient quantity to supply 3.0% nitrogen to the liquor, based on the dry solids content of the same. The mixture was heated at 300° F. in a stainless steel bomb for 4 hours, then cooled and examined. The resulting product had a pH of 5.9 and Brookfield viscosity (75° F.) of 18,000 centipoises.

*Example 9*

This example illustrates the application of a secondary amine in the process of the present invention. 43.8 grams of methyl aniline (enough to furnish 3.0% nitrogen, dry liquor solids basis) were added to 380 grams of the same calcium-base sulfite waste liquor as described in Example 8 and heated under the same conditions as in Example 8. The resulting mixture had a pH of 5.3 and a Brookfield viscosity (75° F.) of 810 centipoises.

*Example 10*

This example illustrates the use of urea in carrying out the herein described process. 9.6 grams of urea (2.3% nitrogen, dry liquor solids basis) was added to 400 grams of calcium-base sulfite waste liquor containing 48% solids by weight, and the mixture was heated as in Example 8. The pH of the resulting product was 4.1 and its Brookfield viscosity (75° F.) 918 centipoises.

*Example 11*

This example illustrates the use of guanidine in executing the presently described process. 24.6 grams of guanidine carbonate (3.0% nitrogen, dry liquor solids basis) was added to 380 grams of calcium-base sulfite waste liquor as described in Example 8, and heated under the same conditions as in Example 8. The pH of the resulting product was 5.9 and its Brookfield viscosity (75° F.) was 956 centipoises.

Accordingly it will be apparent that by the present invention we have provided a process for converting sulfite waste liquor to a wide variety of water soluble products having superior properties and useful as adhesives, dispersants, surface active agents, and in many other applications. The process is easily effectuated and may be carried out inexpensively on a large scale. If thus provides a practical means of converting a waste material to commercially useful products.

Having thus described our invention in preferred embodiments, we claim as new and desire to protect by Letters Patent:

1. The process of modifying sulfite waste liquor which comprises heating at a temperature of from 180–475° F. a mixture having a pH of from 1.5–10 and comprising sulfite waste pulping liquor containing at least one nitrogen compound of the class consisting of ammonia, ammonium hydroxide, ammonium salts, lower aliphatic primary amines, lower aliphatic secondary amines, monocyclic aromatic primary amines, monocyclic aromatic secondary amines, urea, and guanidine, the nitrogen compound being present in amount sufficient to impart to the mixture a nitrogen content of from 0.1 to 10% by weight, dry solids basis; the heating being continued for a time sufficient to increase the Brookfield viscosity of the mixture at 75° F. to at least 350 centipoises, 50% by weight solids basis, but insufficient to render the liquor water insoluble.

2. The modified sulfite waste liquor product of claim 1.

3. The process of modifying sulfite waste liquor which comprises heating at a temperature of from 210–400° F. a mixture of waste sulfite pulping liquor and ammonium hydroxide, the mixture having a pH of from 2–7.5, a solids content of at least 30% by weight, and a sufficient ammonium hydroxide content to impart to the mixture a nitrogen content of from 0.1 to 10% by weight, dry solids basis; the heating being continued for a time sufficient to increase the Brookfield viscosity of the mixture at 75° F. to at least 350 centipoises, 50% by weight solids basis, but insufficient to render the liquor water insoluble.

4. The modified sulfite waste liquor product produced by the process of claim 3.

5. The process of modifying sulfite waste liquor which comprises heating at a temperature of from 210–400° F. a mixture having a pH of from 2–7.5 and comprising waste sulfite pulping liquor having a solids content of at least 30% by weight, and a lower aliphatic primary amine, the primary amine being present in amount sufficient to impart to the mixture a nitrogen content of from 1–10% by weight, dry solids basis; the heating being continued for a time insufficient to render the liquor water insoluble but sufficient to increase its Brookfield viscosity at 75° F. to a value of at least 350 centipoises.

6. The process which comprises heating at a temperature of from 180–475° F. a mixture comprising ammonium base waste sulfite pulping liquor having a pH of from 1.5–10 and a nitrogen content of from 0.1–10% by weight; the heating being continued for a time insufficient to render the mixture water insoluble but sufficient to increase its viscosity until at the 50% solids level it has a Brookfield viscosity at 75° F. of at least 350 centipoises.

7. The modified sulfite waste liquor product produced by the process of claim 6.

8. The process which comprises heating at a temperature of from 210–400° F. a mixture comprising an ammonium base spent sulfite pulping liquor having a solids content of at least 30% by weight, a pH of from 2–7.5, and a nitrogen content of from 0.1–10% by weight; the heating being continued for a time insufficient to render the mixture water insoluble, but sufficient to increase its Brookfield viscosity at the 50% solids level and 75° F. to a value of 1500–100,000 centipoises.

9. The modified sulfite waste liquor product produced by the process of claim 8.

10. The process of modifying ammonium base spent sulfite pulping liquor which comprises substantially dehydrating a quantity of the liquor having a pH of from 2–7.5, and heating the dehydrated product at a temperature of from 180–475° F. until it has been converted into a substantially dry, water-soluble powder, an aqueous solution containing 50% by weight of which has a Brookfield viscosity at 75° F. of at least 350 centipoises.

11. The process of modifying ammonium base spent sulfite pulping liquor which comprises spray drying a quantity of the liquor at a pH level of from 2–7.5 and at a temperature of from 210–400° F., and heating the spray dried product at 210–400° F. until it has been converted to a substantially dry, free-flowing, water soluble product, an aqueous solution containing 50% by weight of which has a Brookfield viscosity at 75° F. of at least 350 centipoises.

12. The process which comprises concentrating an ammonium base sulfite waste liquor having a pH of from 2–7.5 and resulting from the pulping of lignocellulose to a solids content of at least 30% by weight and thereafter spray drying the concentrated liquor at 210–400° F. for a time sufficient to increase its Brookfield viscosity to at least 350 centipoises measured at 50% solids content by weight and at 75° F., but insufficient to render the spray-dried liquor water-insoluble.

13. The process of modifying sulfite waste liquor which comprises heating at a temperature of from 210–400° F. a mixture having a pH of from 2–7.5 and comprising waste sulfite pulping liquor having a solids content of at least 30% by weight, and a monocyclic aromatic primary amine, the primary amine being present in amount sufficient to impart to the mixture a nitrogen content of from 1–10% by weight, dry solids basis; the heating being continued for a time insufficient to render the liquor water insoluble but sufficient to increase its Brookfield viscosity at 75° F. to a value of at least 350 centipoises.

References Cited in the file of this patent

UNITED STATES PATENTS

| | | |
|---|---|---|
| 478,229 | Frank | July 5, 1892 |
| 2,556,334 | Moser | June 12, 1951 |

FOREIGN PATENTS

| | | |
|---|---|---|
| 691,911 | Great Britain | May 27, 1953 |